US006817332B2

(12) United States Patent
Tohyama

(10) Patent No.: US 6,817,332 B2
(45) Date of Patent: Nov. 16, 2004

(54) INTAKE MANIFOLD OF INTERNAL COMBUSTION ENGINE

(75) Inventor: Takeshi Tohyama, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/812,803

(22) Filed: Mar. 30, 2004

(65) Prior Publication Data

US 2004/0187829 A1 Sep. 30, 2004

(30) Foreign Application Priority Data

Mar. 31, 2003 (JP) ........................................ 2003-095040

(51) Int. Cl.[7] .............................................. F02M 35/10
(52) U.S. Cl. .............................. 123/184.57; 123/184.21
(58) Field of Search ....................... 123/184.21, 184.57, 123/184.59, 184.22, 184.53

(56) References Cited

U.S. PATENT DOCUMENTS

| 5,575,249 A | * | 11/1996 | Mielke et al. | 123/184.57 |
| 6,067,953 A | * | 5/2000 | Bloomer | 123/198 E |
| 6,205,968 B1 | * | 3/2001 | Spannbauer | 123/184.57 |

FOREIGN PATENT DOCUMENTS

| JP | 05-60023 | 3/1993 |
| JP | 10-18849 | 1/1998 |
| JP | 10-339224 | 12/1998 |

* cited by examiner

Primary Examiner—Bibhu Mohanty
(74) Attorney, Agent, or Firm—Flynn, Thiel, Boutell & Tanis, P.C.

(57) ABSTRACT

An intake manifold for an internal combustion engine. A first separable part includes an independent intake passage, a first recess, and a first joint section. The independent intake passage has a downstream open end connected to more than one intake port in the engine. The first recess is disposed on a side of the independent intake passage, and has an open end adjacent to an upstream open end of the independent intake passage. The first joint section surrounds the upstream open end of the independent passage and the periphery of the first recess. A second separable part includes a second joint section to abut the first joint section, and a second recess having an opened internal circumference of the second joint section and being disposed opposite to the independent intake passage. Intake air is introduced through the first and second recesses to the intake passage when the first and second separable parts are joined together. A communication hole is defined in the second separable part to communicate to outside. A third separable part covers the communication hole from outward. A resonator includes an outer wall defined by the second and third separable parts.

3 Claims, 4 Drawing Sheets

INTAKE MANIFOLD OF INTERNAL COMBUSTION ENGINE

FIELD OF THE INVENTION

This invention relates to an intake manifold of an internal combustion engine, and more particularly to an intake manifold of an internal combustion engine in which a surge tank and an intake passage are positioned in a space defined by joining separable parts formed of synthetic resin having recesses, and a resonator in communication with the surge tank is provided in a simple divisional construction.

BACKGROUND OF THE INVENTION

In an internal combustion engine having a plurality of cylinders as mounted on a vehicle, an intake manifold is disposed toward an intake side of the engine to introduce intake air to the cylinders. See JP Laid-Open No. H05-60023, JP Laid-Open No. H10-18849, and JP Laid-Open No. H10-339224

In a conventional intake manifold of an internal combustion engine, a surge tank and an intake passage are positioned in a space defined by joining separable parts formed of resin having recesses.

JP Laid-Open No. H10-18849 discloses an intake manifold of an internal combustion engine. The intake manifold of this publication includes a Helmholtz-type resonator comprising a resonance passage and a resonance chamber in the surge tank so as to improve output torque in a certain range for the internal combustion engine.

When such resonator is constructed by resinous divisional parts to form the intake manifold, it is typical that a separating member having a communication hole is disposed in the space to form the resonance passage and the resonance chamber, as disclosed in JP Laid-Open No. H10-339224.

However, if the resonance passage and chamber are formed in the above-mentioned manner, the volume of the resonance chamber is undesirably restrained by the surge tank or the intake passage.

Also, to improve the output torque in the low-mid range of the internal combustion engine by the resonator, the resonance passage is preferably formed to be longer in length. However, it is difficult to form the long resonance passage in the space in the separable parts by the separating member. Also, a joining section may be in a complex shape to join the separating member to the separable parts.

SUMMARY OF THE INVENTION

To obviate or at least minimize the above inconvenience, the present invention provides an improved intake manifold for an internal combustion engine. A first separable part includes an independent intake passage, a first recess, and a first joint section. The independent intake passage has a downstream open end connected to more than one intake port in the engine. The first recess is disposed on a side of the independent intake passage, and has an open end adjacent to an upstream open end of the independent intake passage. The first joint section surrounds the upstream open end of the independent passage and a periphery of the first recess. A second separable part includes a second joint section to abut the first joint section. This second part defines therein a second recess having an opened edge or circumference defined at the second joint section so that the second recess is disposed opposite to the independent intake passage. Intake air is sequentially introduced through the first and second recesses into the intake passage when the first and second separable parts are joined together. A communication hole is defined in the second separable part to communicate to outside. A third separable part covers the communication hole from outward. A resonator includes an outer wall defined by the second and third separable parts. The outer wall defines therein a resonator passage which communicates with the communication hole.

According to the present invention, the design of the volume of the resonator is more flexible. The third separable part is attached outward of the second separable part, which facilitates joining or mounting of the third separable part.

DETAILED DESCRIPTION

The present invention will now be described in specific detail with reference to the accompanying drawings wherein FIGS. 1-7 illustrate an embodiment of the present invention.

Figure 7:
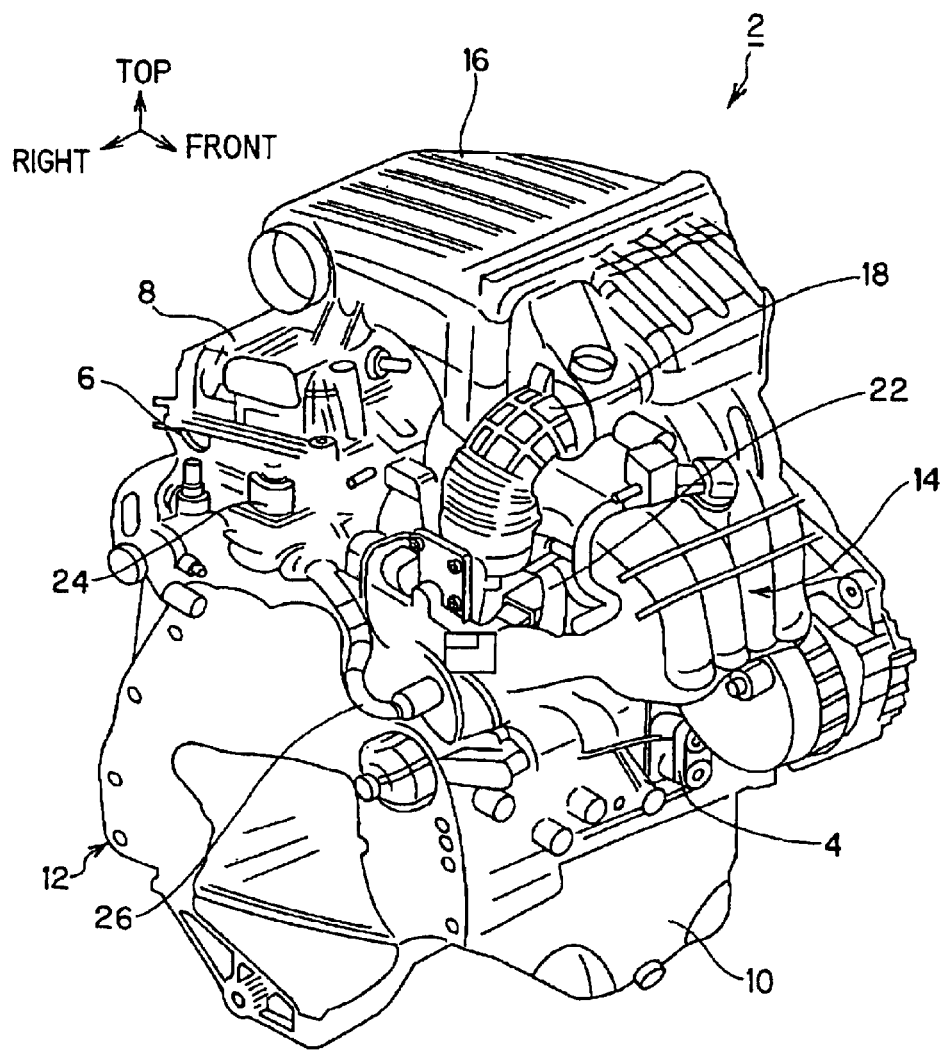
FIG. 7 is a schematic perspective view of the internal combustion engine.

As shown in FIG. 7, an internal combustion engine 2 includes a cylinder block 4, a cylinder head 6 mounted on the top of the cylinder block 4, a cylinder head cover 8 mounted on the top of the cylinder head 6, and an oil pan 10 mounted below the cylinder block 4.

A transmission mounting section 12 is formed on a right side of the internal combustion engine 2, and an intake manifold 14 is attached on a front side thereof.

An air cleaner 16 is disposed on the top of the internal combustion engine 2 and is connected to an upstream side of the intake manifold 14. Between an outlet hose 18 of the air cleaner 16 and a flange 20 (FIG. 2) formed on the upstream side of the intake manifold 14, a throttle body 22 is disposed on an upper right side of the intake manifold 14. Adjacent this throttle body 22 and upward of the transmission mounting section 12, an EGR (exhaust gas recalculation) valve 24 and an EGR pipe 26 are disposed.

Also, a plurality of intake ports (not shown) are connected to a downstream side of the intake manifold 14.

As shown in FIGS. 1-5, the intake manifold 14 is provided with first and second separable parts 28 and 30.

Figure 1:
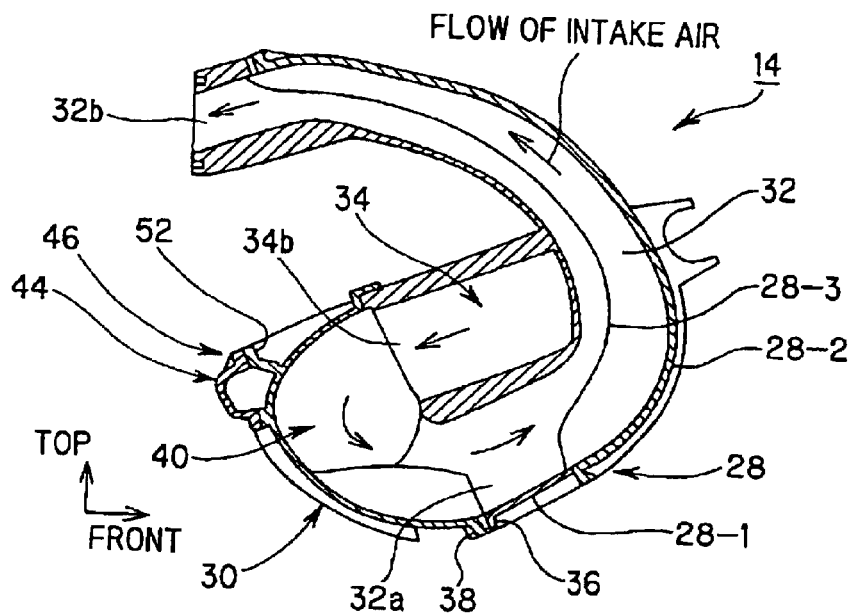
FIG. 1 is a cross-sectional view of an embodiment of the present invention taken along line I—I in FIG. 2.
Figure 2:
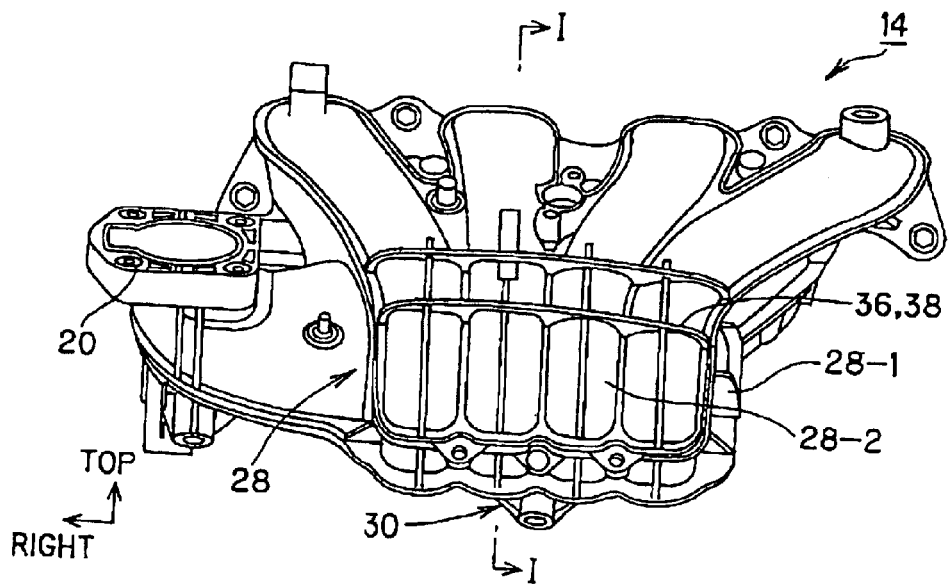
FIG. 2 is a front view of an intake manifold of an internal combustion engine.

First separable part 28 includes an independent intake passage 32, a first recess 34, and a first joint section 36. More particularly, the independent intake passage 32 has a downstream open end 32b connected to more than one intake port (not shown) in the internal combustion engine 2. The first recess 34 is disposed on a side of the independent intake passage 32, and has an open-end 34b sidewardly adjacent to an upstream open-end 32a of the independent intake passage 32 as shown in FIG. 1. The first joint section 36 surrounds the upstream open-end 32a of the independent passage 32 and the periphery of the first recess 34.

The first separable part 28 is divided into inner and outer separable parts 28-1, 28-2 by a center plane of the intake passage 32, as represented by the line 28-3 as shown in FIG. 1.

The second separable part 30 includes a second joint section 38 and defines therein a second recess 40 which functions as a surge tank. More particularly, the second joint section 38 abuts the first joint section 36. The second recess 40 has an opened internal circumference defined by the second joint section 38, and is disposed opposite to the independent intake passage 32.

The intake air is introduced through the first and second recesses 34, 40 to the intake passage 32 when the first and second separable parts 28, 30 are joined together, as shown in FIG. 1.

Further, a communication hole 42 (FIG. 3) is formed in the second separable part 30 to communicate to the outside. A third separable part 44 is mounted from outward to cover the communication hole 42. A resonator 46 includes an outer wall defined by the second and third separable parts 30 and 44.

Figure 3:
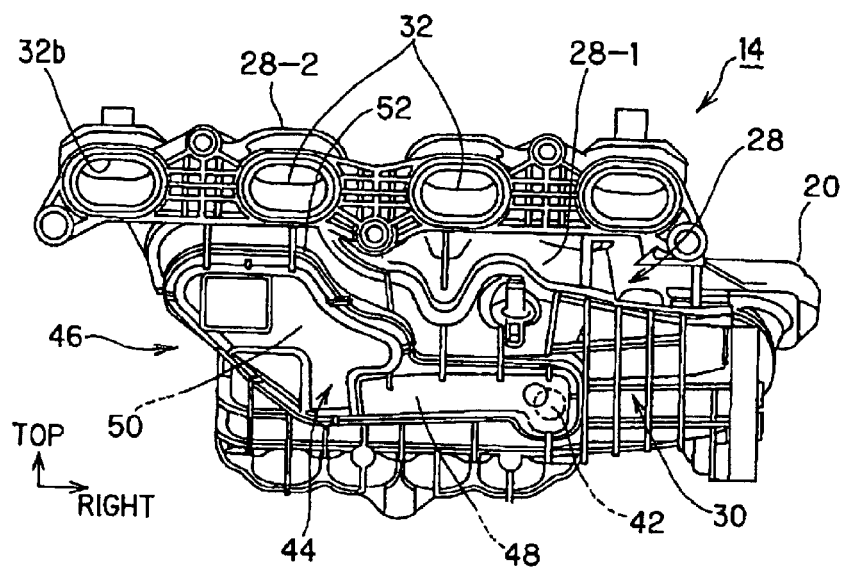
FIG. 3 is a rear view of the intake manifold of the internal combustion engine.
Figure 4:
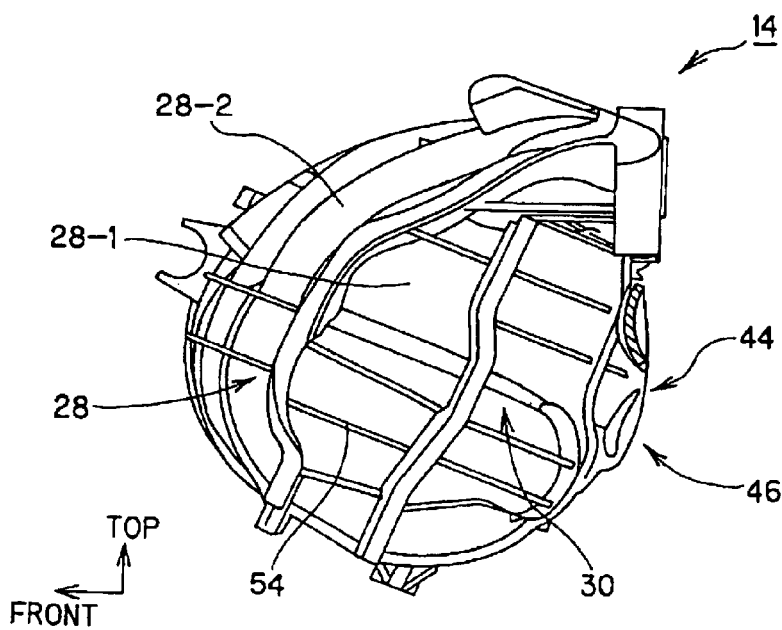
FIG. 4 is a left side view of the intake manifold of the internal combustion engine.
Figure 5:
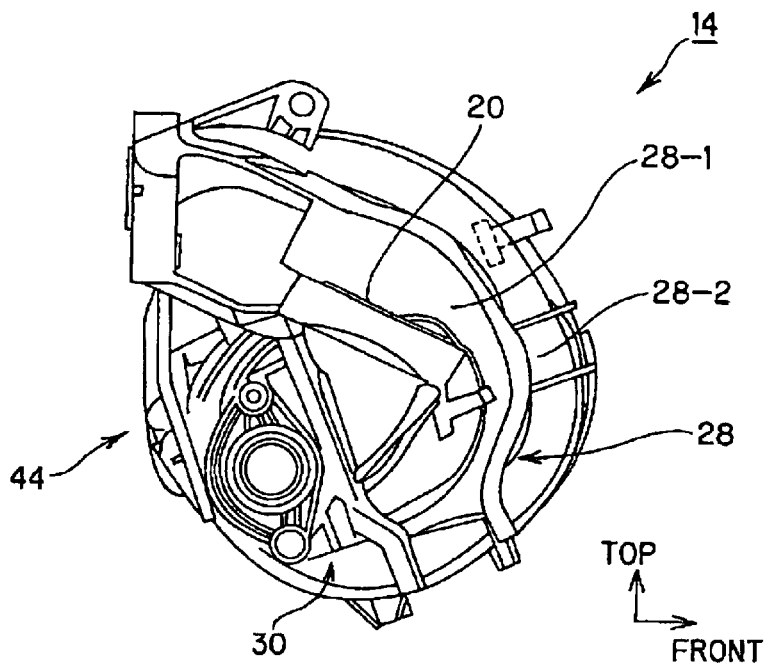
FIG. 5 is a right side view of the intake manifold of the internal combustion engine.

Specifically, as shown in FIGS. 1 and 3, the second separable part 30 includes the communication hole 42 defined in a side thereof which is opposite to the side which communicates with the downstream end 34b of the first recess 34 to permit communication of the second recess 40 with the outside.

This communication hole 42 is covered from outward, and, as shown in FIG. 3, is provided with the third separable part 44 extending toward a side away from the throttle-side flange 20 of the intake manifold 14 (toward the left side in FIG. 3).

The resonator 46 is formed to include an outer wall defined by the second and third separable parts 30 and 44, and is provided with a resonance passage 48 and a resonance chamber 50, as shown in FIG. 3. The resonance passage 48 surrounds and extends away from the communication hole 42. The resonance chamber 50 is defined in communication with an end of the resonance passage 48 which is remote from the communication hole 42.

In addition, the intake passage 32 is bent or curved as it extends away from the first joint section 36 such that the resonance chamber 50 is surrounded by the side of the intake passage 32 facing the third separable part 44. One end of the resonance chamber 50 is closed off by the outer wall of the first separable part 28.

More particularly, the outer wall of the second separable part 30 includes an outwardly protruding annular (i.e. endless) wall 52 (FIG. 1). The third separable part 44 is attached to the annular wall or rib 52 to form the resonator 46. Thereby, an opening (not shown) is defined at an end adjacent the first separable part 28 toward the resonance chamber 50 of the annular wall 52. This opening (not shown) is covered by the outer wall of the first separable part 28, e.g., a third recess 54, to enclose the resonance chamber 50.

All of the separable parts 28-1, 28-2, 30 and 44 can each be constructed in one piece of synthetic resin.

The operation of the embodiment of the invention is explained hereinafter.

The intake air flows through the air cleaner 16 and the outlet hose 18 to the throttle body 22. Then the intake air flows from the throttle body 22 through the throttle-side flange 20 to the intake manifold 14.

Figure 6:
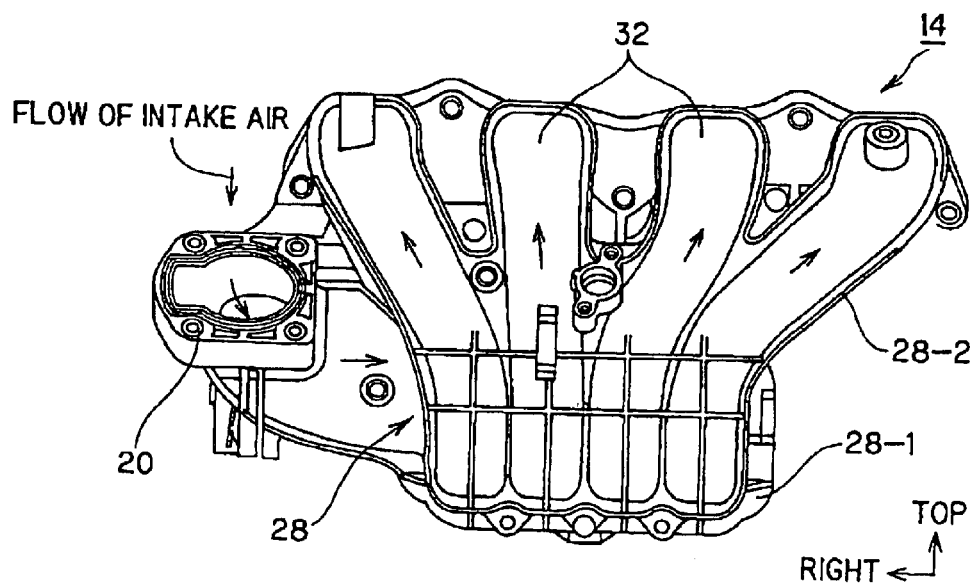
FIG. 6 is a view showing the flow of the intake air in the intake manifold of the internal combustion engine.

As shown in FIGS. 1 and 6, the intake air flowed to the intake manifold 14 is introduced through the first recess 34 of the first separable part 28 and the second recess 40 of the second separable part 30 to the intake passage 32.

Some of the intake air in the second recess 40 of the second separable part 30 flows through the communication hole 42 into the resonator 46, the outer wall of which is defined by the second and third separable parts 30 and 44.

As shown in FIG. 3, the intake air which flows into the resonator 46 is introduced into the resonance chamber 50 through the resonance passage 48.

In the conventional intake manifold of the internal combustion engine, the surge tank and the intake passage are positioned in the space defined by joining separable parts formed of resin having recesses. Also, in the conventional engine intake manifold, the resonator in connection to the surge tank is separated by a separating member in the space so as to improve the output torque in a certain range. In these cases, the volume of the resonance chamber is undesirably restrained by the surge tank or the intake passage. Also, the separating member is joined in the space of the separable part, which complicates the joining part.

Whereas, according to the present invention, the intake manifold 14 is provided with first and second separable parts 28 and 30. First separable part 28 includes the independent intake passage 32, the first recess 34, and the first joint section 36. The independent intake passage 32 has the downstream open end connected to more than one intake port (not shown) in the internal combustion engine 2. The first recess 34 is disposed on the side of the independent intake passage 32, and has the open-end 34b adjacent to the upstream open-end 32a of the independent intake passage 32. The first joint section 36 surrounds the upstream open-end 32a of the independent passage 32 and the periphery of the first recess 34. The second separable part 30 includes the second joint section 38, and the second recess 40. The second joint section 38 abuts the first joint section 36. The second recess 40 has an opened internal circumference or edge defined at the second joint section 38, whereby the recess 40 is disposed opposite to the independent intake passage 32 and the recess 34. The intake air is introduced through the first and second recesses 34, 40 to the intake passage 32 when the first and second separable parts 28, 30 are joined together. The communication hole 42 is formed in the second separable part 30 to communicate to the outside. The third separable part 44 is mounted from outward to cover the communication hole 42. The resonator 46 includes an outer wall defined by the second and third separable parts 30 and 44. Accordingly, the design of volume of the resonator 46 becomes more flexible, which is advantageous in practical use. The third separable part 44 is attached to the outward side of the second separable part 30, which fascinates joining or mounting of the third separable part 44.

In addition, the resonator 46, including the outer wall defined by the second and third separable parts 30 and 44, is formed to include the elongate resonance passage 48 and the larger resonance chamber 50. The resonance passage 48 surrounds and extends away from the communication hole 42. The resonance chamber 50 is defined to communicate with an end of the elongate resonance passage 48 which is remote from the communication hole 42. Accordingly, the setting of the length of the resonance passage 48 becomes more flexible. It is easy to cause the resonance passage 48 to be longer in length to improve the output torque in low and middle speed range.

Furthermore, the intake passage 32 is bent or angled away from the first joint section 36 such that the resonance chamber 50 is surrounded by the side of the intake passage 32 facing the third separable part 44. One end of the resonance chamber 50 is closed off by the outer wall of the first separable part 28. Accordingly, the resonance chamber 50 can be extended toward the first separable part 28, which easily increases the volume of the resonance chamber 50.

The present invention is not limited to the above-mentioned embodiment, but is adaptable for various applications and variations or modifications.

In the above-mentioned embodiment, the resonance passage 48, which extends from and surrounds the communication hole 42, and the resonance chamber 50, which is defined for communication with the resonance passage 48 at a location remote from the communication hole 42, are formed by the resonator 46 having an outer wall defined by the second and third separable parts 30 and 44. However, the resonance passage may be a longer passage as a special configuration.

More particularly, when the resonance passage 48 is formed in the resonator, a rib-shaped member, which protrudes outwardly from the outer wall of the second separable part to engage the third separable part, or which protrudes inwardly from the inner wall of the third separable part to engage the second separable part, may be disposed to function as a jammer plate so as to meander lengthwise of the resonance passage, thereby increasing the length of the resonance passage.

Therefore, the resonance passage may be increased in length to contribute to an increase in the output torque in the low and middle speed range.

As thus described, the present invention provides an intake manifold for an internal combustion engine. A first separable part includes an independent intake passage, a first recess, and a first joint section. The independent intake passage has a downstream open end connected to more than one intake port in the engine. The first recess is disposed on a side of the independent intake passage, and has an open end adjacent to an upstream open end of the independent intake passage. The first joint section surrounds the upstream open end of the independent passage and the periphery of the first recess. A second separable part includes a second joint section to abut the first joint section, and a second recess having an opened internal circumference at the second joint section and disposed opposite to the independent intake passage. Intake air is introduced through the first and second recesses to the intake passage when the first and second separable parts are joined together. A communication hole is defined in the second separable part to communicate to outside. A third separable part covers the communication hole from outward. A resonator includes an outer wall defined by the second and third separable parts. Accordingly, the design of volume of the resonator becomes more flexible, which is advantageous in practical use. The third separable part is attached to the outward side of the second separable part, which fascinates joining or mounting of the third separable part.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. An intake manifold for an internal combustion engine comprising:

a first separable part including an independent intake passage, a first recess, and a first joint section;

said independent intake passage having a downstream open end connected to more than one intake port in the engine;

said first recess being disposed on a side of said independent intake passage and having an open end adjacent to an upstream open end of said independent intake passage;

said first joint section surrounding the upstream open end of said independent passage and a periphery of said first recess;

a second separable part including a second joint section to abut said first joint section, and a second recess having an opened internal circumference of said second joint section, said second recess being disposed opposite to said independent intake passage;

a communication hole in said second separable part communicating between outside and said second recess;

a third separable part to cover said communication hole from outside; and a resonator including an outer wall defined by said second and third separable parts;

wherein intake air is introduced through said first and second recesses to said intake passage when said first and second separable parts are joined together.

2. The intake manifold for the internal combustion engine as defined in claim 1, wherein said resonator includes a resonance passage and a resonance chamber;

said resonance passage extends from and surrounds said communication hole; and said resonance chamber communicates with said resonance passage at a location remote from said communication hole.

3. The intake manifold for the internal combustion engine as defined in claim 1, wherein said intake passage is bent as it extends away from said first joint section such that said resonance chamber is surrounded by a side of said intake passage facing said third separable part so as to enclose said resonance chamber by an outer wall of said first separable part.

* * * * *